(12) United States Patent
Shearon et al.

(10) Patent No.: US 7,075,804 B2
(45) Date of Patent: Jul. 11, 2006

(54) TRACKING SOFT START CIRCUIT FOR GENERATING A PLURALITY OF SOFT START VOLTAGES WHERE ALL SOFT START VOLTAGES ARE PREVENTED UNTIL ALL HAVE BEEN BROUGHT TO THE SAME PRESCRIBED STATE OF OPERATION

(75) Inventors: William Brandes Shearon, Findlay, OH (US); Raymond Louis Giordano, Flemington, NJ (US); Sumer Can, San Jose, CA (US)

(73) Assignee: Intersil Americas Inc., Milpitas, CA (US)

( * ) Notice: Subject to any disclaimer, the term of this patent is extended or adjusted under 35 U.S.C. 154(b) by 284 days.

(21) Appl. No.: 10/757,041

(22) Filed: Jan. 14, 2004

(65) Prior Publication Data
US 2005/0105307 A1 May 19, 2005

Related U.S. Application Data

(60) Provisional application No. 60/523,130, filed on Nov. 18, 2003.

(51) Int. Cl.
*H02M 1/00* (2006.01)
(52) U.S. Cl. .................. 363/49; 323/901; 713/330
(58) Field of Classification Search ............ 323/49, 323/238, 321, 901; 713/330; 363/49
See application file for complete search history.

(56) References Cited

U.S. PATENT DOCUMENTS

| | | | | |
|---|---|---|---|---|
| 5,698,973 A * | 12/1997 | Goerke et al. | ............... | 323/238 |
| 5,811,962 A * | 9/1998 | Ceccherelli et al. | ........ | 323/282 |
| 6,329,856 B1 * | 12/2001 | Tabler et al. | ............... | 327/170 |
| 6,614,669 B1 * | 9/2003 | Kuwana et al. | ............... | 363/49 |
| 6,683,442 B1 * | 1/2004 | Ferencz et al. | ............. | 323/274 |
| 6,691,239 B1 * | 2/2004 | Rose | .......................... | 713/330 |
| 6,862,200 B1 * | 3/2005 | Sullivan et al. | ............... | 363/65 |
| 6,909,204 B1 * | 6/2005 | Batey | ......................... | 307/130 |
| 7,009,369 B1 * | 3/2006 | Ni et al. | ..................... | 323/267 |
| 2002/0073347 A1 | 6/2002 | Zafarana et al. | ........... | 713/300 |

OTHER PUBLICATIONS

IBM Technical Disclosure Bulletin, vol. 29, No. 12, May 1987, Armonk, NY, USA, "Power Supply Restart Feature", pp. 5310-5314.
EDN Electrical Design News, Rogers Pub. Co. Englewood, CO, vol 33, No. 11, May 26, 1988, "Battery-Backup Circuit Offers System Reset", T. Pattorson, Research and Productivity Council, Fredericton, New Brunswick, Canada, pp. 212-213.
IBM Technical Disclosure Bulletin, Vo. 35, No. 7, Dec. 1992, Armonk, NY, USA, "Delayed Power-On Circuit With Soft Start", pp. 197-198.

* cited by examiner

*Primary Examiner*—David M. Gray
*Assistant Examiner*—Harry R Behm
(74) *Attorney, Agent, or Firm*—Allen, Dyer, Doppelt, Milbrath & Gilchrist, P.A.

(57) ABSTRACT

A tracking soft start circuit architecture contains a plurality of soft start circuits for generating a plurality of soft start voltages during startup for application to associated power supply terminals of a power supply system. The soft start circuits are interconnected in such a manner that prevents any soft start circuit from generating a soft start voltage waveform until all of the controlled power output devices have been brought to the same prescribed state of operation, that is, all power FET gates are precharged and their source voltages match each other.

18 Claims, 2 Drawing Sheets

TRACKING SOFT START CIRCUIT FOR GENERATING A PLURALITY OF SOFT START VOLTAGES WHERE ALL SOFT START VOLTAGES ARE PREVENTED UNTIL ALL HAVE BEEN BROUGHT TO THE SAME PRESCRIBED STATE OF OPERATION

CROSS-REFERENCE TO RELATED APPLICATION

The present application claims the benefit of co-pending U.S. Application Ser. No. 60/523,130, filed Nov. 18, 2003, entitled: "A Tracking Soft Start Circuit," by William B. Shearon et al, assigned to the assignee of the present application and the disclosure of which is incorporated herein.

FIELD OF THE INVENTION

The present invention relates to power supply systems and subsystems therefor, and is particularly directed to a soft start circuit for a power supply of the type used to power personal computers and the like. The configuration of the soft start circuit allows it to be interconnected to a plurality of like soft start circuits for generating a plurality of soft start voltages for application to associated power supply terminals of a power supply system. Each soft start circuit is operative to controllably generate a soft start voltage waveform in response to a controlled power output device thereof being brought to a prescribed state of operation (e.g., fully charged source-follower output). The soft start circuits are interconnected in such a manner that prevents any soft start circuit from generating a soft start voltage waveform until all of the controlled power output devices have been brought to the same prescribed state of operation.

BACKGROUND OF THE INVENTION

Power supply systems used for powering personal computers and the like are continually being subjected to more restraints, including limitations during powering up and powering down mode. Such constraints become particularly significant where multiple supplies are involved and there are demands to provide lower voltage components that minimize power consumption and maximize speed. A common challenge for systems that employ multiple supply voltages is that, during power-up mode and normal operation, it may be necessary to constrain some supplies at a lower voltage than other supplies in order to avoid latch-up. In addition to this sequencing restriction, it is sometimes the case that the voltage difference between the outputs of two supplies during turn on must not exceed a specified, relatively small voltage. These two conditions lead to the requirement that the power supplies turn on at the same time and track each other until the lowest voltage supply reaches its final value. Once this occurs the remaining supplies may continue to track up to their operating values.

SUMMARY OF THE INVENTION

In accordance with the present invention this objective is successfully attained by a soft start circuit architecture that is operative to generate a plurality of soft start voltages for application to associated power supply terminals of a multi output power supply system. As will be described, each of a plurality of soft start circuits is placed in a state of being able to controllably generate a soft start voltage waveform in response to a controlled power output device thereof being brought to a prescribed state of operation. The actual generation of soft start voltage waveforms is constrained by wire-oring inputs to a control circuit in each soft start circuit that is configured to prevent any of the soft start circuits from actually generating a soft start voltage waveform until all of the controlled power output devices of the plurality of soft start circuits have been brought to the prescribed state of operation.

A first embodiment the tracking soft start circuit of the present invention has an input port to which an operational voltage is supplied, and an output port coupled to the source of an output (source-follower) MOSFET from which an output voltage is derived. The input port is coupled to an input capacitor referenced to ground, and to a common node between a first MOSFET switch and a reference resistor. The MOSFET switch has its source-drain current flow path connected in series with the reference resistor and ground and its gate electrode coupled to the output of a turn-off threshold comparator. As long as the output of the source-follower output MOSFET is at ground or the vicinity thereof, the turn-off threshold comparator keeps the MOSFET switch turned on.

The reference resistor is coupled to an input reference current source which supplies a fixed current thereto so as to establish a reference voltage at the non-inverting (+) input of an operational transconductance amplifier. This reference voltage is selected to be sufficient to fully charge the gate of the source-follower output MOSFET. The current output port of the operational transconductance amplifier is coupled to the gate of the output MOSFET. A fixed current source is coupled to the common connection of the current output and the gate of output MOSFET. Depending upon the output of operational transconductance amplifier, the gate of the output MOSFET is either pulled up by the fixed current source, or pulled down by the current output of the operational transconductance amplifier. The drain of the output MOSFET is coupled to an external supply voltage, while the source of the output MOSFET is coupled to the tracking soft start circuit's output port.

The source of the output (source-follower) MOSFET is fed back to the inverting (−) input of the turn-off threshold comparator and to the inverting (−) input of the operational transconductance amplifier. The non-inverting (+) input of the turn-off threshold comparator is coupled to receive a prescribed voltage that is less than the product of the output of the input reference current source and the reference resistor feeding the non-inverting (+) input of the operational transconductance amplifier. For purposes of providing a set of non-limiting operational parameters, this prescribed voltage may comprise 50 mV, while the product of the input reference current source and the reference resistor may correspond to a voltage of 75 mV.

In operation, with the source of the output MOSFET being initially at ground, the inverting (−) input of the turn-off threshold comparator will be less that the reference voltage (50 mV) at its non-inverting (+) input, so that the output of the comparator turns on the MOSFET switch. With the MOSFET switch turned on, the input capacitor remains discharged, while a fixed current flows from the input reference current source through the reference resistor and the (turned-on) MOSFET switch to ground. This flow of input reference current through the reference resistor develops a reference voltage on the order of 75 mV across the reference resistor, which is applied to the non-inverting (+) input of the operational transconductance amplifier. As a consequence, that amplifier drives the gate of the source-follower MOSFET, so as to develop a source voltage of 75 mV as a balancing input to the amplifier's inverting (−) input.

As the voltage at the source of output MOSFET departs from its initial value of ground and increases towards 75 mV, it eventually crosses the 50 mV threshold value supplied to the non-inverting (+) input of the turn-off threshold comparator. When this occurs, the output of the comparator changes state, turning off the MOSFET switch, and terminating the sinking of current from input reference current source through the reference resistor and the MOSFET switch to ground. Instead, the current from the input reference current source begins to charge the input capacitor, causing a voltage ramp to be applied to the non-inverting input of the operational transconductance amplifier. In order to balance this voltage ramp at its inverting input, transconductance amplifier replicates this voltage ramp at the source output of the source-follower output MOSFET, so that the desired soft start operation at output port is achieved.

As pointed out earlier, the circuit architecture of an individual tracking soft start circuit described above is configured so that it may be interconnected with one or more other like soft start circuits. When so interconnected, each soft start circuit is be placed in a state of being able to controllably generate a soft start voltage waveform, in response to a controlled power output device thereof being brought to a prescribed state of operation. However, the actual generation of all of the soft start voltage waveforms is dictated by the last (slowest) soft start circuit to have its output source follower voltage cross the turn-off threshold of its turn-off threshold comparator. This is achieved by wire-oring all of the input ports together. Since all of the input ports are connected to a common node and that common node is the drain of each MOSFET switch, then as long as at least one MOSFET switch is turned on, all of the input capacitors will remain discharged. Eventually, when the last MOSFET switch turns off, there will no longer be a discharge short to ground for all of the input capacitors, so that they may proceed to charge and produce the desired soft start ramp voltages.

Namely, until the last MOSFET switch of the wire-ored plurality is turned off, that MOSFET switch will serve as a continuous short or discharge path to ground for all of the inputs of the ganged together soft start circuits. This means that while other soft start circuits are ready to commence their soft start operation they are delayed from doing so until the last MOSFET switch is turned off. Once this happens, however, all of the wire-ored soft start circuits simultaneously commence charging the common input capacitor(s) creating a solitary voltage ramp which is tracked by all the operational transconductance amplifiers and produced at the sources of the source follower MOSFETs for application to the respective output ports, as described above.

A second embodiment of the tracking soft start circuit of the invention also includes an operational transconductance amplifier having its output coupled to the gate of a source follower output MOSFET, as in the first embodiment. The source follower voltage at the output port from the source of the output MOSFET is fed back to a −in port that feeds the gate of a first MOSFET of a current mirror—comparator circuit. The first MOSFET operates as a source follower and provides a level shift to the inverting (−) input of the amplifier. This first MOSFET has its source-drain path coupled between a current source and a second, diode-connected MOSFET, which is coupled in current mirror configuration with a third MOSFET, whose source-drain path is coupled between ground and the source-drain path of a fourth MOSFET, which is also coupled to the current source.

The gate of the fourth MOSFET is coupled to a threshold reference resistor which is coupled to a current source that produces a fixed current. The current supplied through the threshold reference resistor produces a reference voltage that is functionally equivalent to the (50 mV) reference voltage applied to the comparator in the soft start circuit of the first embodiment.

The drain of the third MOSFET is coupled to the gate of a fifth MOSFET having its drain-source path coupled between a current source and ground. The drain of the fifth MOSFET is coupled through a pair of cascaded inverters to the gate of a MOSFET switch, the source-drain current flow path through which is coupled between an input node +in and ground. This MOSFET switch provides the functionality of the MOSFET switch in the soft start circuit of the first embodiment. The +in input node is further coupled to the gate of a sixth, source-follower MOSFET, which has its source-drain current flow path coupled in series with a seventh MOSFET and an offset resistor, which is coupled to a current source and to the non-inverting (+) input of the amplifier. The sixth, source-follower MOSFET provides a level shift to the non-inverting (+) input of the operational transconductance amplifier. The seventh MOSFET is used to match the second MOSFET, so that the bias conditions of the first and sixth MOSFETs match and do not have an error. Also coupled to the +in input is an input reference current source and an input (current ramp) capacitor.

In operation, the input to the gate of the sixth, source-follower MOSFET is initially at ground and the current supplied by its associated current source develops a voltage across the offset resistor, which produces a voltage on the order of 75 mV at the non-inverting (+) input of the operational transconductance amplifier. The MOSFET switch is turned on at this time so that there is no ramp voltage developed across the input capacitor at the gate input to the sixth MOSFET. As in the first embodiment, the amplifier drives its output so as to balance its inverting (−) input, causing the source of the output MOSFET to be at 75 mV. This voltage is applied to the −in terminal at the gate of level-shifting source follower first MOSFET.

The current from the current source feeding the first and fourth MOSFETs is applied through the first MOSFET to the second MOSFET. Due to current mirror action, the third MOSFET attempts to equalize the current in the leg containing the third MOSFET and the fourth MOSFET. However, the fourth MOSFET has its gate coupled to a voltage on the order of 50 mV developed across the reference resistor as a result of the reference current applied to it. Eventually as the source follower output MOSFET's output voltage applied to the −in input to the gate of the first MOSFET rises to 50 mV, the two legs of the current mirror circuitry match, pulling the same current, and this brings the current mirror MOSFET's current slightly higher than balanced with its associated current source. This action causes inverter pair to turn off the MOSFET switch.

With the MOSFET switch turned off, the input capacitor can begin charging from the input current source, to provide a soft start ramp voltage at the +in input to the gate of the sixth MOSFET. The amplifier and therefore the output source follower MOSFET now track the soft start ramp voltage developed at the +in terminal.

As with the case of the soft start architecture of the first embodiment, the implementation of the second embodiment may be employed to ensure proper soft start of a plurality N of such soft start circuits, by wire-oring the +in inputs together. Because their +in inputs are wire-ored together they are all connected so that one of the MOSFET switches which will be the last to turn off as a result of the gate of the first MOSFET reaching the reference value of its associated voltage reference applied to the fourth MOSFET. Again, until the last MOSFET switch of the wire-ored plurality of soft start circuits is turned off, it will provide a continuous short or discharge path to ground for all of the +in inputs of the ganged together soft start circuits. Once the last MOSFET switch is turned off, all of the ganged together soft start circuits simultaneously commence charging their associated input capacitor(s), creating a single voltage ramp tracked by all the operational transconductance amplifiers and produced at the sources of the source follower MOSFETs for application to the respective output ports.

DETAILED DESCRIPTION

Figure 1:
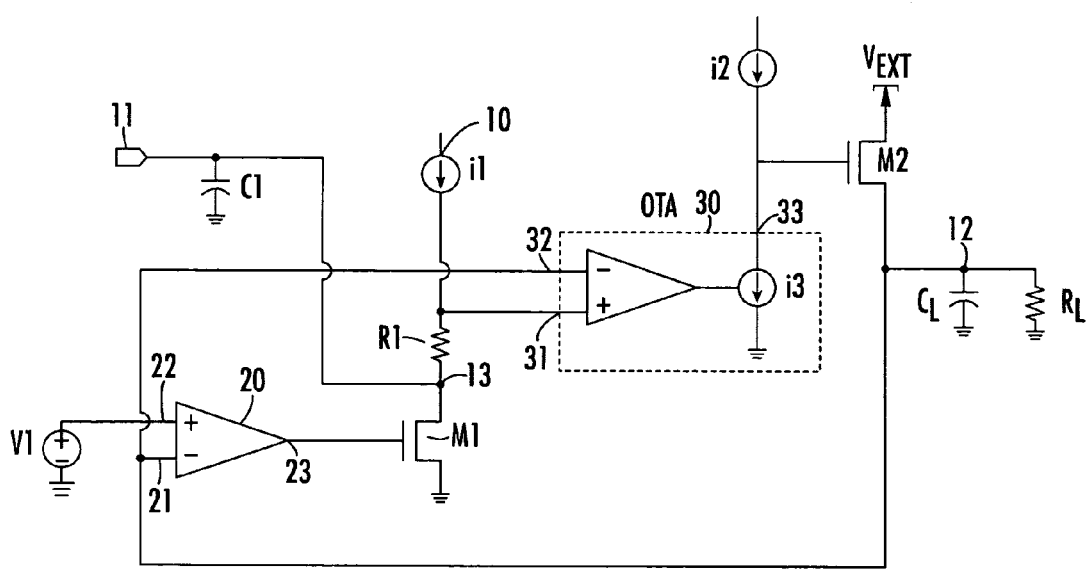
FIG. 1 diagrammatically illustrates a reduced complexity schematic of a tracking soft start circuit in accordance with a first embodiment of the present invention.

Attention is now directed to FIG. 1, wherein a reduced complexity schematic of the tracking soft start circuit in accordance with a first embodiment of the present invention is diagrammatically shown as comprising an input port 11, to which an operational voltage is supplied, and an output port 12 coupled to the source of an output MOSFET M2, from which an output voltage that is delivered to a load, comprising a capacitive component $C_L$ and a resistive component $R_L$, is derived. Input port 11 is coupled to an input capacitor C1 referenced to ground, and to a common node 13 between a first MOSFET switch M1 and a resistor R1. MOSFET switch M1 has its source-drain current flow path connected in series with resistor R1 and ground and its gate electrode coupled to the output 23 of a comparator 20. Resistor R1 is coupled to a current source 10 which supplies a fixed current i1, and to the non-inverting (+) input 31 of an operational transconductance amplifier 30, whose current output 33 is coupled to the gate of an output MOSFET M2. A fixed current source i2 is coupled to the common connection of the current output 33 and the gate of output MOSFET M2. Depending upon the output of transconductance amplifier 30, the gate of MOSFET M2 is either pulled up by current source i2 or pulled down by the current output 33 of the amplifier 30.

The drain of output MOSFET M2 is coupled to an external supply voltage Vext, and the source of MOSFET M2 is coupled to the output port 12. The source of MOSFET M2 is also fed back to the inverting (−) input 21 of comparator 20 and to the inverting (−) input 32 of transconductance amplifier 30. The non-inverting (+) input 22 of comparator 20 is coupled to a fixed voltage source V1, where V1 is some prescribed voltage less than the product of the output of current source i1 and resistor R1. For purposes of providing a set of non-limiting operational parameters, V1 may comprise 50 mV, while the product of the output of current source i1 and resistor R1 corresponds to a voltage value that is greater than this to account for OTA input offset and system ground offsets. As a result, manufacturing variability cannot cause V1 to ever be larger than i1*R1, which would thwart startup.

In operation, with the source follower output of MOSFET M2 being initially at ground, the inverting (−) input 21 of comparator 20 is less that the reference voltage (50 mV) at its non-inverting (+) input 22, so that the output of comparator 20 turns on MOSFET switch M1. With MOSFET switch M1 turned on, input capacitor C1 remains discharged, while a fixed current i1 flows from current source 10 through resistor R1 and switch M1 to ground. This flow of current i1 through resistor R1 develops a reference voltage on the order of 75 mV across resistor R1, which is applied to the non-inverting (+) input 31 of operational transconductance amplifier 30. As a consequence, amplifier 30 drives the gate of MOSFET M2 so as to develop a source voltage of 75 mV as a balancing input to the amplifier's inverting (−) input 32. As the voltage at the source of output MOSFET M2 departs from its initial value of ground and increases towards 75 mV, it eventually reaches the 50 mV value supplied by voltage source V1 to the non-inverting (+) input 22 of comparator 20. When this occurs, the output 23 of comparator 20 changes state, turning off MOSFET switch M1, and terminating the sinking of current from current source 10 through resistor R1 to ground. Instead, the current from current source 10 begins to charge capacitor C1 causing a voltage ramp to be applied to the non-inverting input 31 of transconductance amplifier 30. In order to balance this voltage ramp at its inverting input 32, transconductance amplifier 30 replicates this voltage ramp at the source output of output MOSFET M2, so that the desired soft start operation at output port 12 for the individual stage of FIG. 1 is achieved.

Figure 2:
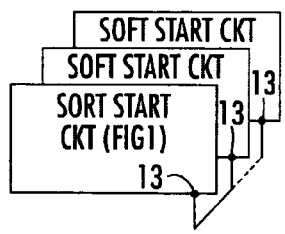
FIG. 2 is a block diagram shown the manner in which a plurality of the tracking soft start circuits of the invention may be wire-ored together.

A particularly advantageous attribute of the soft start architecture of FIG. 1 is the manner in which it may be used to ensure proper soft start of a plurality N of such soft start circuits, whose inputs 11 are ganged (wire-ored) together, as diagrammatically illustrated in FIG. 2. In this architecture, it can be expected that different ones of the soft start circuits have components of different parametric values, so that each of the circuits is not identically the same. Because their inputs are wire-ored together they are all connected to that one of the MOSFET switches M1 which will be the last to turn off as a result of its associated comparator 20 detecting the MOSFET M2 source follower voltage reaching the reference value of its associated voltage reference V1. Until the last MOSFET switch M1 is turned off, that MOSFET switch M1 will serve as a continuous short or discharge path to ground for all of the inputs of the ganged together soft start circuits. This means that while the other soft start circuits are ready to commence their soft start operation they are delayed from doing so until the last MOSFET switch M1 is turned off. Once this happens, however, all of the ganged together soft start circuits simultaneously commence charging their associated input capacitors C1, creating a voltage ramp which is tracked by the operational transconductance amplifiers and produced at the sources of the source follower MOSFETs M2 for application to the respective output ports 12, as described above.

Figure 3:
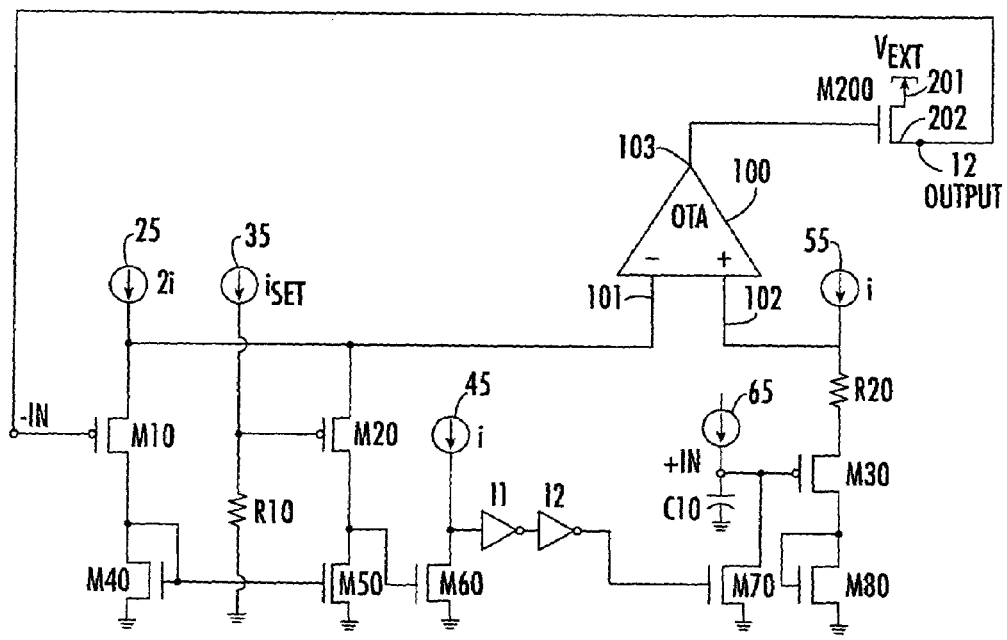
FIG. 3 diagrammatically illustrates a schematic of a tracking soft start circuit in accordance with a second embodiment of the present invention.

Attention is now directed to FIG. 3, which shows a non-limiting example of an implementation of a second embodiment of the tracking soft start circuit described above with reference to FIG. 1. As shown therein, an operational transconductance amplifier (OTA) 100 has its output 103 coupled to the gate of a source follower output MOSFET M200 (MOSFET M200 effectively corresponding to the source follower MOSFET M2 of FIG. 1). Output MOSFET 200 has its drain 201 coupled to a supply voltage Vs and its source 202 coupled to an output port 12. The source follower voltage at the output port 12 from the source 202 of output MOSFET M200 is fed back to a −in port that feeds the gate of a MOSFET M10.

MOSFET M10 serves as a source follower and provides a level shift to the inverting (−) input 101 of OTA 100. MOSFET M10 has its source-drain path coupled between a current source 25 and a MOSFET M40, which is coupled in current mirror configuration with a MOSFET M50, whose source-drain path is coupled between ground and the source-drain path of MOSFET M20, which is also coupled to current source 25. The gate of MOSFET M20 is coupled to a resistor R10, which is coupled to a current source 35 that produces a fixed current iset. The current supplied by current source 35 through resistor R10 produces a reference voltage across resistor R10 that is functionally equivalent to the (50 mV) reference voltage V1 applied to the comparator 20 in the circuit of FIG. 1.

The drain of MOSFET M50 is coupled to the gate of a MOSFET M60 having its drain-source path coupled between a current source 45 and ground. The drain of MOSFET M60 is coupled through a pair of cascaded inverters I1 and I2 to the gate of a MOSFET switch M70, the source-drain current flow path through which is coupled between an input node +in and ground. (As will be described, MOSFET switch M70 provides the functionality of the MOSFET switch M1 in the circuit of FIG. 1.) The +in input node is further coupled to the gate of a source-follower MOSFET M30, which has its source-drain current flow path coupled in series with a MOSFET M80 and a resistor R20, which is coupled to a current source 55 and to the non-inverting (+) input 102 of OTA 100. MOSFET M30 provides a level shift to the non-inverting (+) input 102 of OTA 100 to comply with a requirement that voltage input to the OTA be above ground. MOSFET M80 is used to match MOSFET M40 so that the drains of MOSFETs M10 and M30 do not have an error. Also coupled to the +in input is a current source 65 and a capacitor C10.

In operation, the input to the gate of source follower MOSFET M30 is initially at ground and the current supplied by current source 55 develops a voltage across resistor R20, which produces a voltage on the order of 75 mV at the non-inverting (+) input 102 of the OTA 100. MOSFET switch M70 is turned on at this time so that there is no ramp voltage developed across capacitor C10 at the gate input to MOSFET M30. As in the first embodiment, OTA 100 drives its output so as to balance the inverting (−) input 101, causing the source output of MOSFET M200 to drive toward 75 mV. This voltage is applied to the −in terminal at the gate of level-shifting source follower MOSFET M10.

The current from current source 25 is applied through MOSFET M10 to MOSFET M40. Due to current mirror action, MOSFET M50 attempts to equalize the current in the leg containing MOSFET M50 and MOSFET M20. However, MOSFET M20 has its gate coupled to a voltage on the order of 50 mV developed across resistor R10 as a result of the current source 35 applied to it. Eventually as the source follower M200 output voltage applied to the −in input to the gate of MOSFET M10 rises to 50 mV, the two legs of the current mirror circuitry match, pulling the same current, overdriving M60, tripping the inverters and switching off M70, and the inverting (−) input 101 of OTA continues to rise past 50 mV. The drain of MOSFET M50 gates MOSFET M60 to pull current from source 45. This action causes inverter pair I1 and I2 to turn off MOSFET switch M70.

With MOSFET switch M70 turned off, capacitor C10 begins charging from current source 65, providing a soft start ramp voltage at the +in input to the gate of MOSFET M30. The OTA 100 and therefore the output source follower MOSFET M200 now track the 75 mV offset soft start ramp voltage developed at the +in terminal.

As with the case of the soft start architecture of FIG. 1, the circuit of FIG. 3 may be employed to ensure proper soft start of a plurality N of such soft start circuits, by wire-oring the +in inputs together, similar to the illustration of FIG. 2. Because their +in inputs are wire-ored together they are all connected to that one of the MOSFET switches M70 which will be the last to turn off as a result of the gate of MOSFET M10 reaching the reference value of its associated voltage reference V1 applied to associated MOSFET M20. Again, until the last MOSFET switch M70 of the wire-ored plurality of soft start circuits is turned off, it will provide a continuous short or discharge path to ground for all of the +in inputs of the ganged together soft start circuits. Once the last MOSFET switch M70 is turned off, all of the ganged together soft start circuits simultaneously commence charging all ganged input capacitors C10, creating one voltage ramp to be tracked by the OTAs 100 and produced at the sources of the source follower MOSFETs M200 for application to the respective output ports 12.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. A soft start circuit for a power supply comprising:
   an input port which is adapted to be coupled to said power supply;
   an output port from which a soft start output voltage is to be provided;
   a start-up voltage generator adapted to be coupled to said input port;
   a controlled output power circuit device coupled to said output port;
   an operational amplifier having an output coupled to said controlled output power circuit device, a first input coupled to receive a first prescribed reference voltage, and a second input coupled to monitor said output port; and
   a comparator having an output coupled to said start-up voltage generator, a first input coupled to receive a second prescribed reference voltage less than said first prescribed reference voltage, and a second input coupled to monitor said output port, and wherein said comparator is operative, in response to the voltage at said output port exceeding said second prescribed reference voltage, to enable said start-up voltage generator to apply a start-up voltage signal to said first input of said operational amplifier, whereupon said operational amplifier drives said output port with a soft start voltage corresponding to said start-up voltage signal.

2. The soft start circuit according to claim 1, wherein said comparator is operative, in response to the voltage at said output port not exceeding said second prescribed reference voltage, to prevent said start-up voltage generator from applying a start-up voltage signal to said first input of said operational amplifier.

3. The soft start circuit according to claim 1, wherein said start-up voltage generator comprises a capacitor and an input current generator coupled thereto.

4. The soft start circuit according to claim 3, wherein said start-up voltage generator further includes a comparator-controlled discharge switch coupled with said capacitor and being operative, in response to the voltage at said output port not exceeding said second prescribed reference voltage, to prevent said capacitor from being charged by said input current generator coupled thereto.

5. The soft start circuit according to claim 4, wherein said comparator-controlled discharge switch has an input terminal coupled to said input port, an output terminal coupled to receive a reference potential, and a control terminal coupled to the output of said comparator.

6. A soft start circuit according to claim 1, wherein said operational amplifier is operative to cause said controlled output power circuit device to replicate said soft start voltage signal at said output port.

7. A soft start circuit architecture for generating a plurality of soft start voltages for application to associated power supply terminals of a power supply system, comprising a plurality of soft start circuits, each respective one of which is operative to controllably generate a soft start voltage waveform in response to a controlled power output device thereof being brought to a prescribed state of operation, and a control circuit which is operative to prevent any of said soft start circuits from generating a soft start voltage waveform until all of said controlled power output devices of said plurality of soft start circuits have been brought to said prescribed state of operation.

8. The soft start circuit architecture according to claim 7, wherein a respective one of said plurality of soft start circuits comprises:
   an input port which is adapted to be coupled to a power supply;
   an output port from which a soft start output voltage is to be provided;
   a start-up voltage generator adapted to be coupled to said input port;
   a controlled output power circuit device coupled to said output port;
   an operational amplifier having an output coupled to said controlled output power circuit device, a first input coupled to receive a first prescribed reference voltage, and a second input coupled to monitor said output port; and
   a comparator having an output coupled to said start-up voltage generator, a first input coupled to receive a second prescribed reference voltage less than said first prescribed reference voltage, and a second input coupled to monitor said output port, and wherein said comparator is operative, in response to the voltage at said output port exceeding said second prescribed reference voltage, to enable said start-up voltage generator to apply a start-up voltage signal to said first input of said operational amplifier, whereupon said operational amplifier drives said output port with a soft start voltage corresponding to said start-up voltage signal; and wherein
   said control circuit is operative, in response to the voltage at the output port of any of said soft start circuits not exceeding said second prescribed reference voltage, to prevent the start-up voltage generators of all of said soft start circuits from applying start-up voltage signals to first inputs of their operational amplifiers.

9. The soft start circuit architecture according to claim 8, wherein said start-up voltage generator comprises a capacitor and an input current generator coupled thereto.

10. The soft start circuit architecture according to claim 9, wherein said start-up voltage generator further includes a comparator-controlled discharge switch coupled with said capacitor and being operative, in response to the voltage at said output port not exceeding said second prescribed reference voltage, to prevent said capacitor from being charged by said input current generator coupled thereto.

11. The soft start circuit architecture according to claim 10, wherein said comparator-controlled discharge switch has an input terminal coupled to said comparator, an output terminal coupled to receive a reference potential, and a control terminal coupled to the output of said comparator.

12. The soft start circuit architecture according to claim 8, wherein said operational amplifier is operative to cause said controlled output power circuit device to replicate said soft start voltage signal at said output port.

13. A soft start circuit for a power supply comprising:
   an input port which is adapted to be coupled to said power supply and to which a capacitor is coupled;
   a current source for controllably charging said capacitor;
   a controlled switch coupled to said input port and being controllably operative to maintain said capacitor in a discharged state for a first condition of said soft start circuit, but to allow said capacitor to charge and thereby generate a soft start voltage for a second condition of said soft start circuit;
   an output port from which a soft start output voltage is to be provided;
   a controlled output power circuit device coupled to said output port;
   an operational amplifier having an output coupled to said controlled output power circuit device, a first input coupled to receive a first prescribed reference voltage, and a second input coupled to monitor said output port; and
   a comparator having an output coupled to said controlled switch, a first input coupled to receive a second prescribed reference voltage less than said first prescribed reference voltage, and a second input coupled to monitor said output port, and wherein said comparator is operative, in response to the voltage at said output port not exceeding said second prescribed reference voltage corresponding to said first condition of said soft start circuit, to cause said switch to maintain said capacitor in a discharged state and thereby prevent a soft start voltage from being generated thereby and, in response to the voltage at said output port exceeding said second prescribed reference voltage corresponding to said second condition of said soft start circuit, to allow said capacitor to charge and thereby generate said soft start voltage.

14. The soft start circuit according to claim 13, wherein said first prescribed reference voltage corresponds to the product of current generated by said current source and a reference resistor coupled to said first input of said operational amplifier.

15. The soft start circuit according to claim 13, wherein said first prescribed reference voltage corresponds to the product of a current generated by a further current source and a reference resistor coupled to said first input of said operational amplifier.

16. The soft start circuit according to claim 15, wherein said comparator includes a current mirror having an input coupled to said output port, and wherein an output of said current mirror is coupled to said second input of said operational amplifier.

17. The soft start circuit according to claim 13, wherein said operational amplifier is operative to cause said controlled output power circuit device to replicate said soft start voltage at said output port.

18. The soft start circuit according to claim 13, wherein said controlled switch has an input terminal coupled to said input port, an output terminal coupled to receive a reference potential, and a control terminal coupled to the output of said comparator.

* * * * *